United States Patent
Duquesne et al.

(10) Patent No.: US 10,104,840 B2
(45) Date of Patent: Oct. 23, 2018

(54) SYSTEM AND METHOD OF CONTROLLING A CLEANING SIEVE IN AN AGRICULTURAL HARVESTER

(71) Applicant: CNH Industrial America LLC, New Holland, PA (US)

(72) Inventors: Frank R. G. Duquesne, Zwevegem (BE); Bart M. A. Missotten, Herent (BE); Glenn Aesaert, Roeselare (BE); Dré W. J. Jongmans, AG Klundert (NL); Thomas Mahieu, Ypres (BE); Frederik Tallir, Esen (BE); Karel M. C. Viaene, Moorslede (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/313,421

(22) PCT Filed: May 28, 2015

(86) PCT No.: PCT/EP2015/061888
§ 371 (c)(1),
(2) Date: Nov. 22, 2016

(87) PCT Pub. No.: WO2015/181315
PCT Pub. Date: Dec. 3, 2015

(65) Prior Publication Data
US 2017/0196169 A1    Jul. 13, 2017

(30) Foreign Application Priority Data

May 28, 2014 (BE) .................. 2014/0406

(51) Int. Cl.
*A01D 75/28* (2006.01)
*A01F 12/44* (2006.01)
*A01D 41/127* (2006.01)

(52) U.S. Cl.
CPC .......... *A01F 12/448* (2013.01); *A01D 41/127* (2013.01); *A01D 75/282* (2013.01)

(58) Field of Classification Search
CPC ..... A01D 41/127; A01D 75/282; A01F 12/28; A01F 12/44; A01F 12/446; A01F 12/448
(Continued)

(56) References Cited

U.S. PATENT DOCUMENTS 4,875,889 A   10/1989  Hagerer et al.
7,001,267 B2*  2/2006  Behnke ................ A01D 41/127
                                                   460/6

(Continued)

FOREIGN PATENT DOCUMENTS

EP    1595435 A1   11/2005
EP    2550851 A1    1/2013
GB    2014025 A     8/1979

*Primary Examiner* — Robert E Pezzuto
(74) *Attorney, Agent, or Firm* — Peter K. Zacharias; Patrick M. Sheldrake

(57) ABSTRACT

A cleaning section of an agricultural harvester. The cleaning section including a sieve, a plurality of load sensors, and a sieve slope compensating system. The sieve is positioned in the harvester to receive crop material from a threshing section. The plurality of load sensors are coupled to the sieve. The load sensors are configured to produce signals representative of a distributed load of the crop material on the sieve. The sieve slope compensating system is configured to tilt or side shake the sieve dependent upon the signals.

12 Claims, 6 Drawing Sheets

(58) Field of Classification Search
USPC ...... 460/4–7, 91–93, 101.102; 209/233, 416, 209/261
See application file for complete search history.

(56) References Cited

U.S. PATENT DOCUMENTS

| | | |
|---|---|---|
| 7,572,180 B2 | 8/2009 | Ricketts et al. |
| 8,118,649 B1 | 2/2012 | Murray et al. |
| 8,880,299 B2 * | 11/2014 | Murray ................ A01D 75/282 209/233 |
| 9,125,346 B2 | 9/2015 | Schulz |
| 2006/0229119 A1 * | 10/2006 | Wamhof .............. A01D 75/282 460/101 |
| 2010/0016044 A1 * | 1/2010 | Adamson .............. A01F 12/448 460/101 |
| 2013/0172057 A1 | 7/2013 | Farley et al. |

\* cited by examiner

SYSTEM AND METHOD OF CONTROLLING A CLEANING SIEVE IN AN AGRICULTURAL HARVESTER

CROSS REFERENCE TO RELATED APPLICATION

This application is the National Stage of International Application No. PCT/EP2015/061888 filed May 28, 2015, which claims priority to Belgian Application No. 2014/0406 filed May 28, 2014, the contents of which are incorporated herein by reference.

BACKGROUND OF THE INVENTION

The present invention relates to agricultural harvesters such as combines, and, more particularly, to a sieve attitude control in cleaning systems used in such combines.

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material, such as straw, from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

During the cleaning operation crop material that lands on the sieves from the threshing system may be randomly distributed. However, often the operation of the threshing system can bias where the crop material lands on the sieves. For example, if a clump of some sort occurs between the rotor and the concaves, then the material flow through the concaves is altered and hence the distribution of the material on the sieves is affected. The rotation of the rotor itself and variations in the speed of the rotor will impart variations in the movement of crop material through the concaves, which also serves to alter the distribution of crop material on the sieves.

The cleaning systems of prior art harvesters have certain adjustments that can be made, which for the most part are static during the harvesting operation.

What is needed in the art is a dynamic sieve control system that reduces grain loss in the cleaning system as the combine is harvesting crops.

SUMMARY OF THE INVENTION

The present invention provides a system and method of redistributing crop material after it falls onto a grain sieve in an agricultural harvester.

The invention in one form is directed to a cleaning section of an agricultural harvester, the cleaning section including a sieve, a plurality of load sensors, and a sieve slope compensating system. The sieve is positioned in the harvester to receive crop material from a threshing section. The plurality of load sensors are coupled to the sieve. The load sensors are configured to produce signals representative of a distributed load of the crop material on the sieve. The sieve slope compensating system is configured to tilt and/or alter the shaking of the sieve dependent upon the signals.

The invention in another form is directed to a method of altering a lateral tilt or sideways movement of a sieve in a cleaning section of an agricultural harvester. The method includes the steps of detecting an imbalance in the distributed load on a sieve; and actuating at least one actuator to laterally tilt and/or shake the sieve dependent upon the detected imbalance.

The present invention advantageously improves the cleaning capacity of the cleaning system by redistributing the crop material on the sieve.

Another advantage of the present invention is that it reduces grain loss.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrates embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
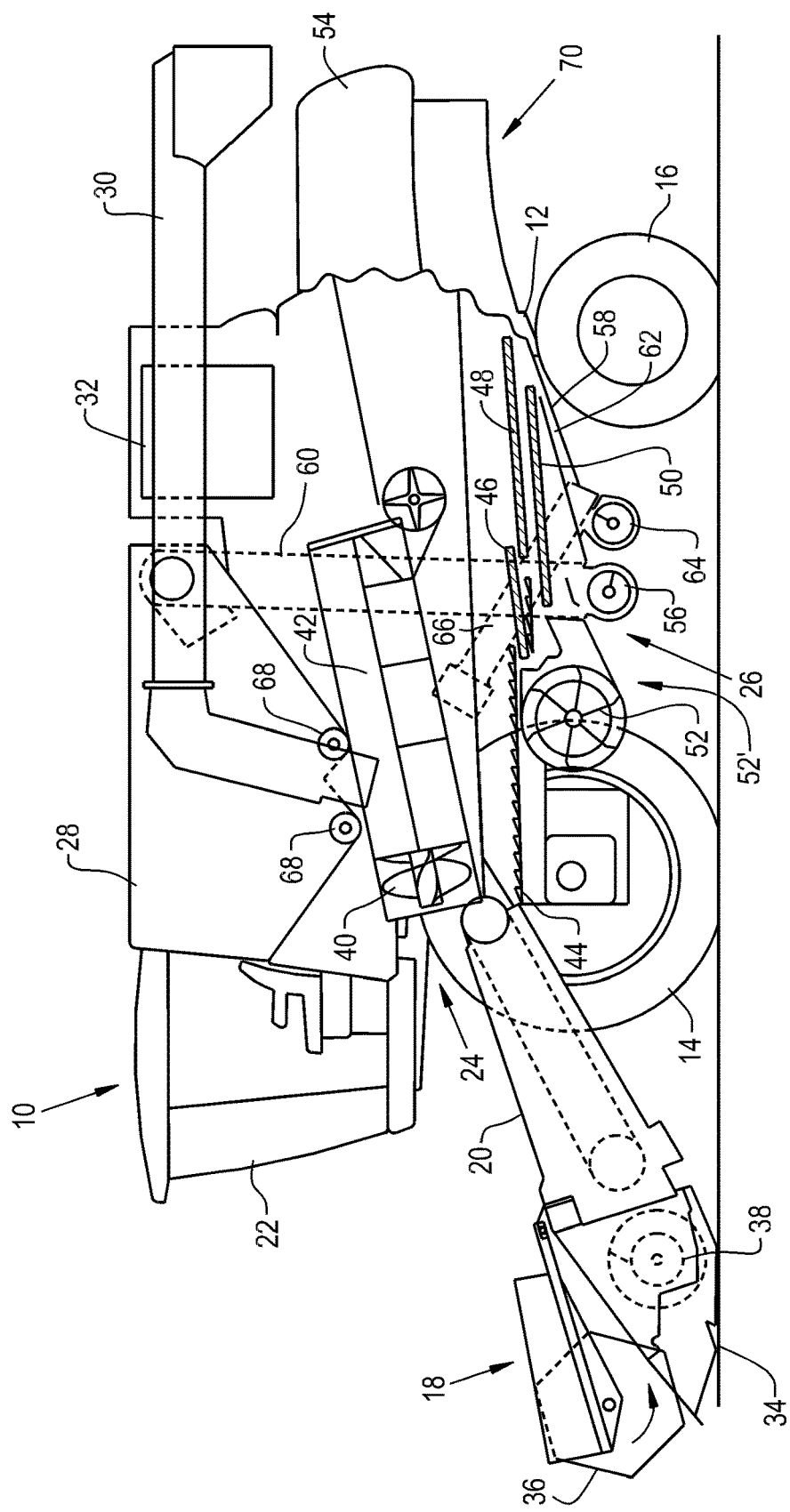
FIG. 1 is a side view of an embodiment of an agricultural harvester in the form of a combine which includes an embodiment of a sieve attitude adjustment system of the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

The front wheels 14 are larger flotation type wheels, and the rear wheels 16 are smaller steerable wheels. Motive force is selectively applied to the front wheels 14 through a power plant in the form of a diesel engine 32 and a transmission (not shown). Although the combine 10 is shown as including wheels, is also to be understood that the combine 10 may include tracks, such as full tracks or half-tracks.

The header 18 is mounted to the front of the combine 10 and includes a cutter bar 34 for severing crops from a field during forward motion of the combine 10. A rotatable reel 36 feeds the crop into the header 18, and a double auger 38 feeds the severed crop laterally inwardly from each side toward the feeder housing 20. The feeder housing 20 conveys the cut crop to the threshing and separating system 24, and is selectively vertically movable using appropriate actuators, such as hydraulic cylinders (not shown).

The threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42. Although the threshing and separating system 24 is illustrated as being of an axial-flow type having a rotor, it is also contemplated to use the present invention with other conventional threshing systems.

Grain which has been separated by the threshing and separating assembly 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52 which provides an airflow through the sieves to remove chaff and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across the sieves 48, 50, while permitting the passage of cleaned grain by gravity through the openings of the sieves 48, 50.

Clean grain falls to a clean grain auger 56 positioned crosswise below and in front of the lower sieve 50. The clean grain auger 56 receives clean grain from each sieve 48, 50 and from the bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via the tailings auger 64 and the return auger 66 to the upstream end of the cleaning system 26 for repeated cleaning action. A pair of grain tank augers 68 at the bottom of the grain tank 28 convey the clean grain laterally within the grain tank 28 to the unloading auger 30 for discharge from the combine 10.

The non-grain crop material proceeds through a residue handling system 70. The residue handling system 70 may include a chopper, counter knives, a windrow door and a residue spreader.

Figure 2:
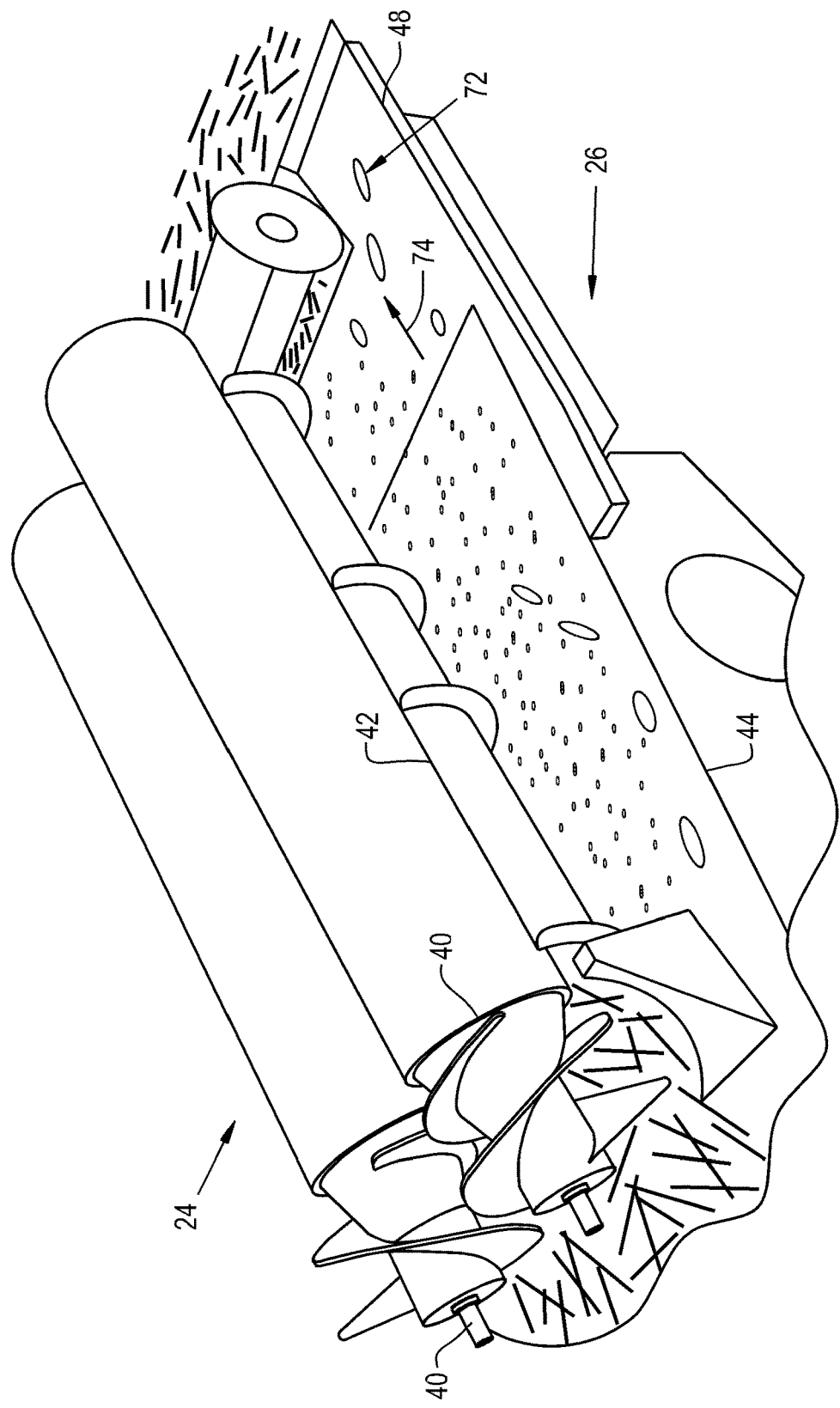
FIG. 2 is a perspective view of part of the threshing and the cleaning systems contained in the combine of FIG. 1.

Now, additionally referring to FIG. 2 there is shown and illustrated, in a schematic fashion, part of the threshing and separating system 24 and the cleaning system 26. As crop material 72 falls from the threshing and separating system 24 onto the grain pan 44 and the pre-cleaning sieve 46, the crop material 72 is distributed in a manner that is prejudiced by the actions of the threshing and separating system 24, and by the random nature of the crop material 72 itself. The distribution of the crop material 72 will vary as grain leaves the non-grain material, and as the crop material 72 moves in a crop material movement direction 74. For purposes of explaining the present invention, it will be discussed as being applied to the sieve 48, although it is to be understood that the present invention may be applied to other sieves in combine 10, and can be applied to more than one sieve at a time, or even to the grain pan 44. The sensor can be placed in the fall step at the end of the grain pan 44 to sense the resistance that the air experiences as it flows through the fall step at the end of the grain pan to grain pan (pre blowing) or the grain pan 44 to the sieve 48.

Figure 3:
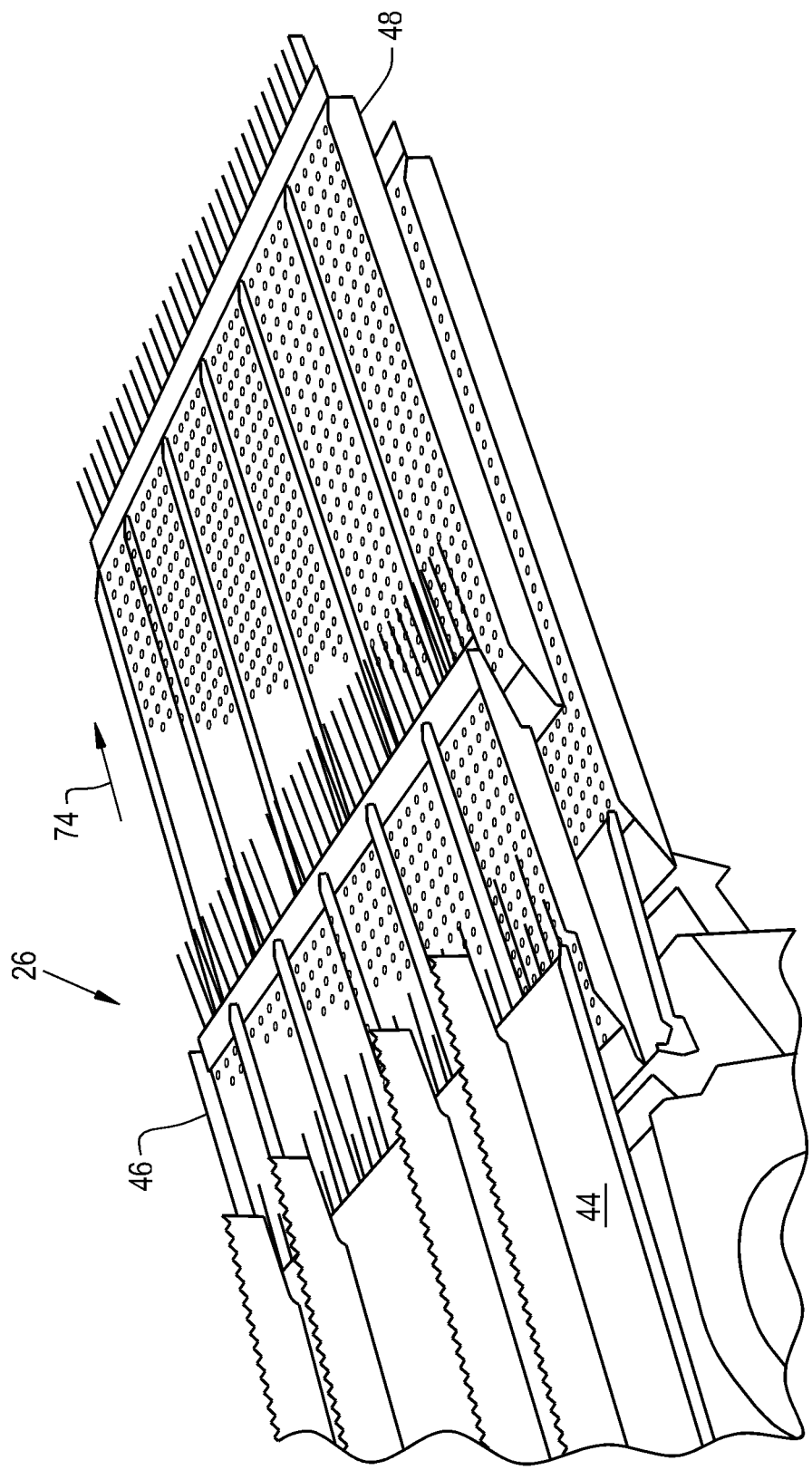
FIG. 3 is a perspective view of a sieve associated with the cleaning system of FIG. 2.
Figure 4:
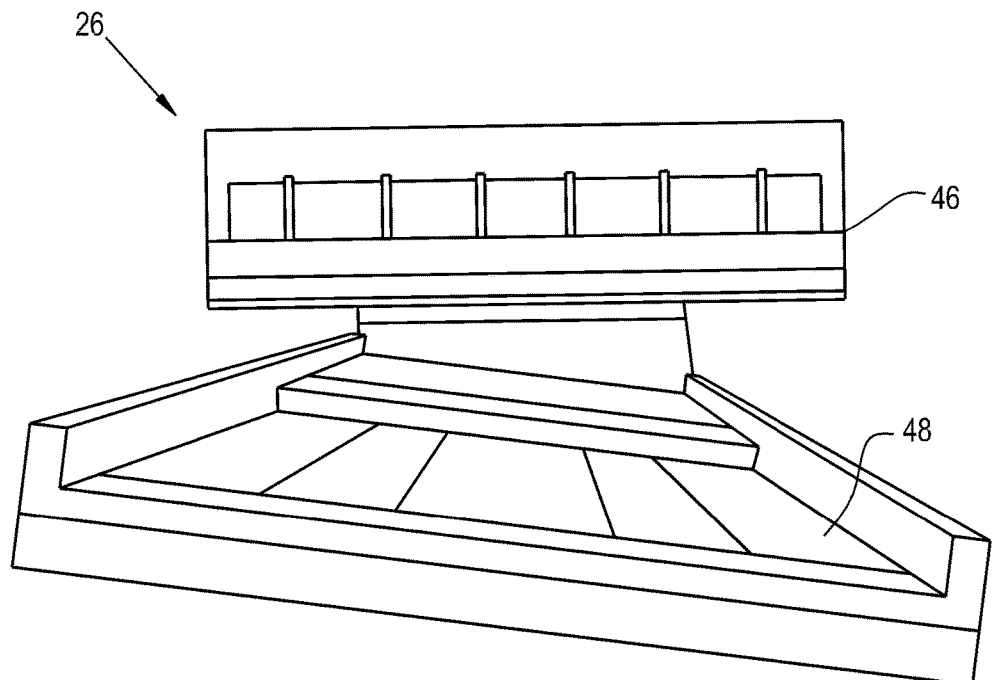
FIG. 4 is another perspective view of the sieve in the cleaning system of FIGS. 2 and 3.

Now, additionally referring to FIGS. 3-7, the crop material 72 travels in the direction 74 onto the sieve 48, and the crop material 72 generally continues in the direction 74, being moved by the motions of the sieve 48. FIG. 3 shows a possible construct and position of the sieve 48. FIG. 4 shows the sieve 48 in a somewhat schematical fashion, being tilted by the present invention, so as to alter a distribution of the crop material 72 (not shown here for the purpose of clarity).

Figure 5:
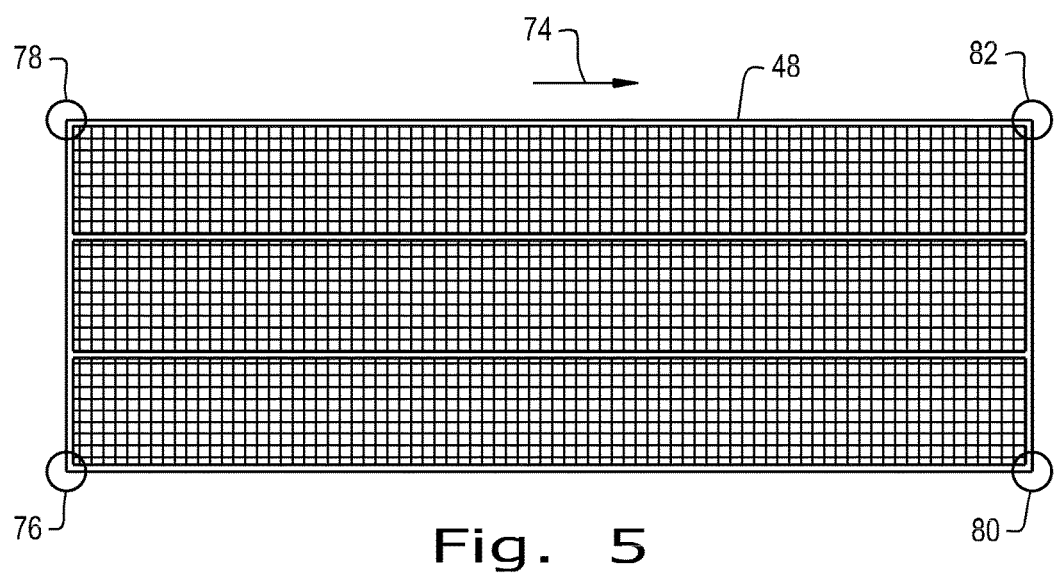
FIG. 5 illustrates a top view of the sieve of FIGS. 2-4.

The distribution of the crop material 72 on the sieve 48 is detected and altered by a sieve slope compensating system 90 that uses load sensors, such as pressure sensors 76, 78, 80 and 82, illustrated in FIG. 5 in a schematic fashion, on a schematically illustrated version of the sieve 48. The pressure sensors 76, 78, 80 and 82 produce signals representative of the combined weight of the sieve 48 and the crop material 72. The signals, more importantly, provide the information on the distribution of the crop material 72, in the form of pressure readings, and more specifically the difference in the readings, which indicate the left-right distribution of the crop material 72 on the sieve 48. The air pressure underneath the sieves 46, 48, 50 is a result of the wind coming from the cleaning fan 52, the size of the openings in the sieves 46, 48, 50 and the amount of crop material lying on top of the sieves 46, 48, 50. The more crop is lying on the sieves 46, 48, 50, the more resistance the air from the cleaning fan 52 will experience when blowing through the sieves 46, 48, 50. Uneven crop distributions will thus result in pressure differences between different locations underneath the sieves 46, 48, 50 and the pressure sensors 76, 78, 80, 82 will provide an accurate indication of the crop distribution. Although the embodiments described below use pressure sensors 76, 78, 80, 82 for measuring the crop distribution, also other types of sensors will be suitable for the same purpose. Load sensors for measuring the crop distribution on the sieves 46, 48, 50 or the grain pan 44 may, e.g., be embodied as impact sensors, wind-speed sensors, sonar or radar. Also sensors for measuring the layer thickness of the crop layer at different positions on the sieves 46, 48, 50 can be used for this purpose.

The sieve slope compensating system 90 additionally includes a controller 84, an actuator 86 and sensors 88. The sensors 88 may be in the form of impact sensors. The signals are received by the controller 84, which is in communication with the pressure sensors 76, 78, 80 and 82 and with the actuator 86 that is configured to laterally tilt the sieve 48 or to alter a side shaking movement, such as the amplitude, of the sieve 48 to thereby alter the distribution of the crop material 72. The pressure sensors 76, 78, 80 and 82 can be thought of as two pairs of pressure sensors, 76, 78 and 80, 82, with the pair 76 and 78 being closest to the end of the sieve 48 where the crop material 72 first contacts the sieve 48. The pressure sensors 76 and 78 may have their signals combined to produce a single difference signal, which signals an imbalance in the weight distribution from a lateral perspective. This combined signal is received by the controller 84, and the controller 84 sends a command to the actuator 86 to laterally tilt the sieve 48 so as to predictively alter the distribution of the crop material 72 on the sieve 48. The pressure sensors 76, 78, 80 and 82 may each include a resilient deformable tube that is coupled to selected portions of the sieve 48 with the fluid or gas pressure therein varying as the weight of the distribution of the crop material 72 varies on the sieve 48. The variation in pressure in the tubes are detected and used to create the signals sent to the controller 84.

While the crop material 72 is generally moving in the direction 74, the crop material 72 may also take on some lateral movement, due to the lateral tilting or shaking of the sieve 48, so as to improve the distribution of the crop material 72 as it moves along the sieve 48. The movement of the crop material 72 is not uniform and the lateral movement of some portions of the crop material 72 causes a spreading of the crop material 72 on the sieve 48. The pressure sensors 80 and 82 are positioned proximate to the end of the sieve 48 in the crop material movement direction 74 allowing a measurement of the distribution of the crop material 72 close to the end of travel along the sieve 48, and hence a measure of the effectiveness of the lateral tilt. Another measure of effectiveness may be undertaken with a set of sensors 88 that may be impact sensors, which measure a distribution of either grain passing through the sieve 48 or the impact of the crop material that leaves the end of the sieve 48.

Figure 6:
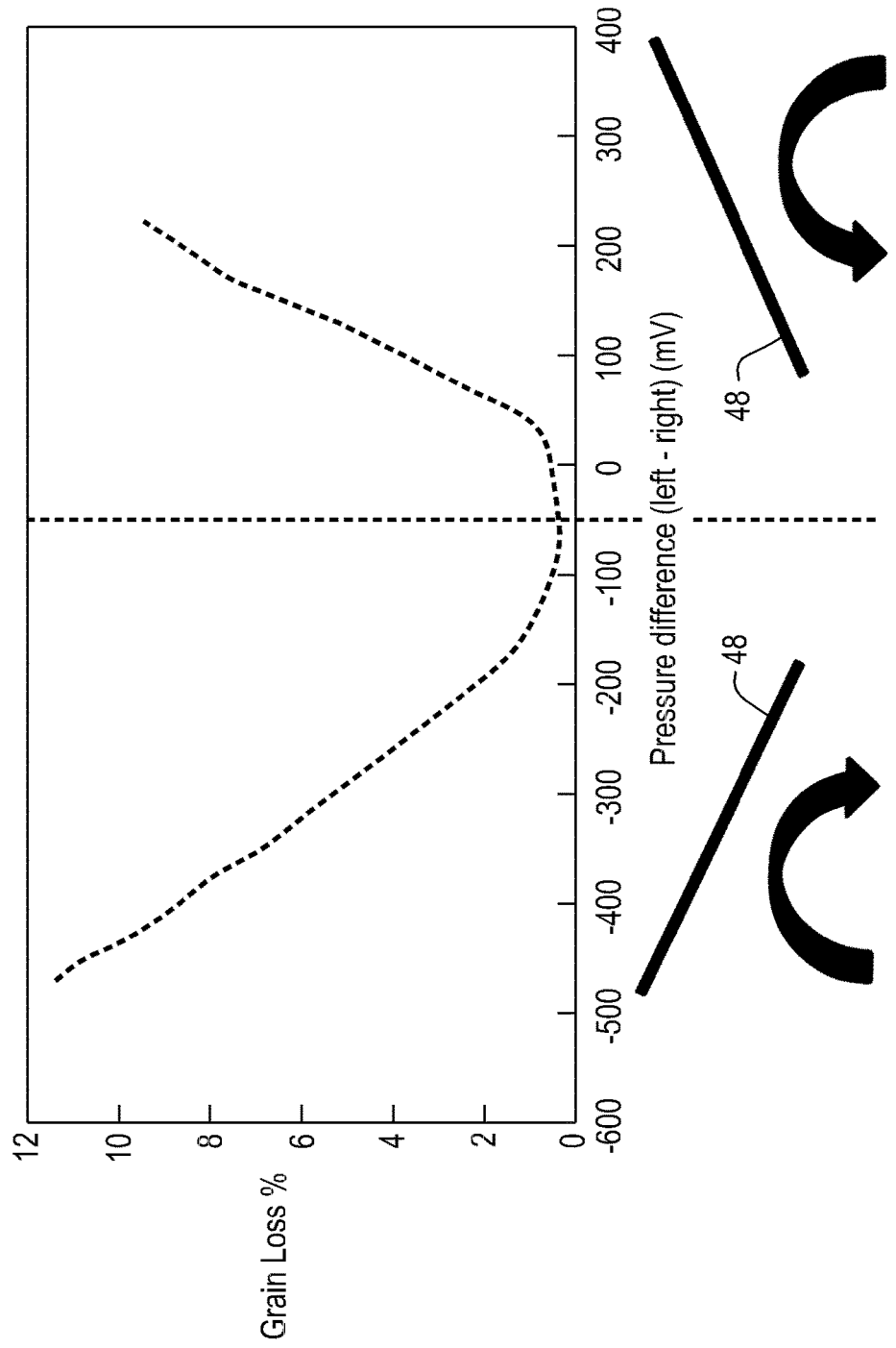
FIG. 6 is a chart illustrating sieve losses based on the distribution of crop material on the sieve shown in FIGS. 2-4.
Figure 7:
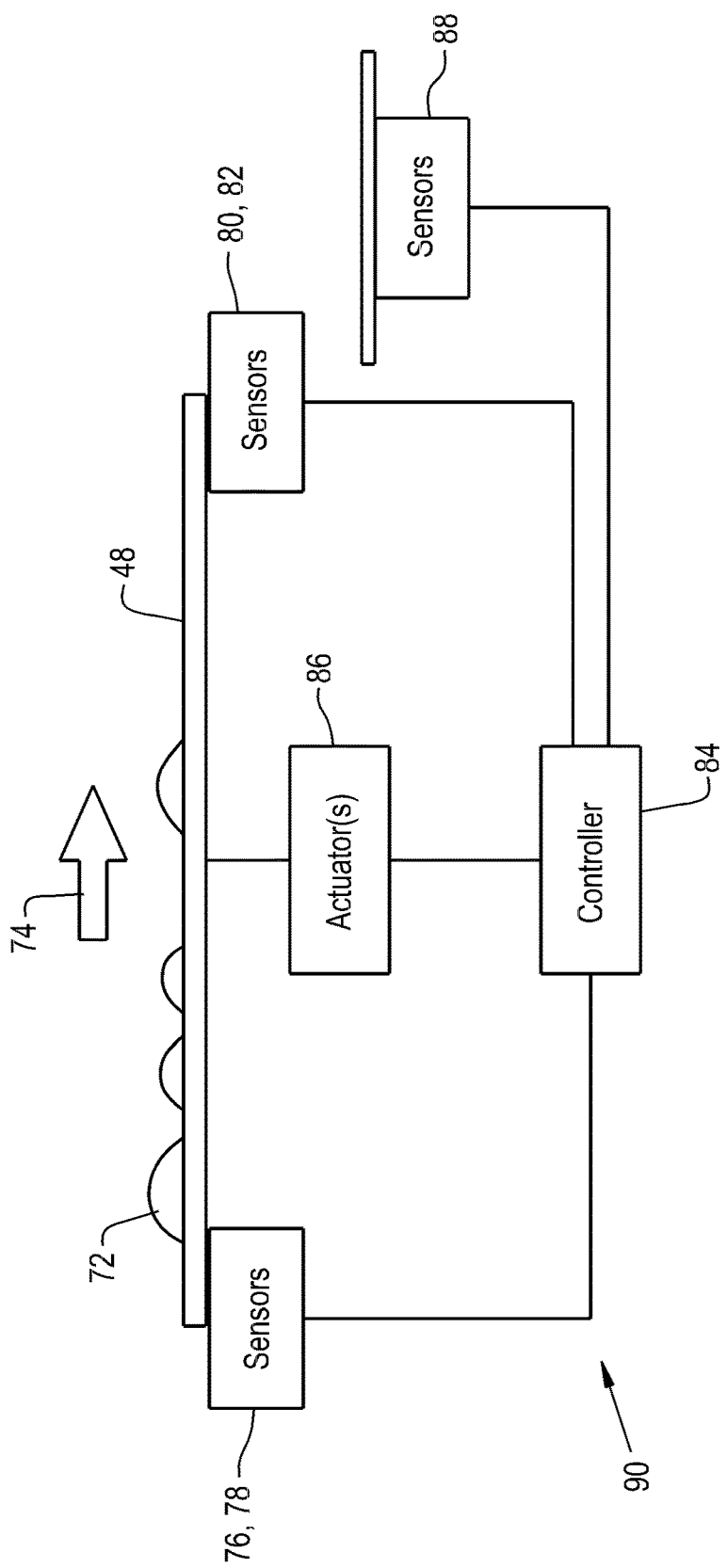
FIG. 7 is a schematical representation of an embodiment of a sieve lateral tilting or shaking system of the present invention contained in the harvester of FIG. 1.

FIG. 6 illustrates a percentage of grain loss along a vertical axis and a measured pressure difference on a set of the pressure sensors 76 and 78; and/or 80 and 82. The pressure difference, here illustrated as an approximate −50 mV signal, which is representative of a slight pressure difference, in this example, results in an optimized low grain loss. The actual value and units of the value are representative and only used as an illustration. This value is provided as an example, and is not intended to establish a baseline value. It is understood that lateral tilting or shaking of the sieve 48 to the left and right (as needed) is undertaken to result in the optimized distribution of the crop material 72. The tilting or shaking of the sieve 48 is carried out by the actuator 86 under the direction of the controller 84. The controller 84 uses an algorithm that accounts for the variations that may occur in the distribution of the crop material 72 that falls onto the sieve 48 and how the crop material 72 moves laterally in response to an attitude change carried out by the actuator 86. The sieve slope compensating system 90 may give preference to the signals coming from the pressure sensors 76 and 78, since they are close to the area where the crop material 72 first contacts the sieve 48, with the signals from the pressure sensors 80 and 82 being used to evaluate the effectiveness of actions taken by the sieve slope compensating system 90.

The lateral angle of the sieve 48 is controlled based on the detection of an unbalance in the amount of material 72 along the width of the sieve 48. By controlling the lateral sieve angle the material 72 becomes evenly spread on the sieves and the maximum sieve potential is used, which results in an increased cleaning capacity. The detection of the unbalance is accomplished with sensors, such as the pressure sensors (76, 78, 80, 82) described above, or by way of impact sensors, wind-speed sensors, sonar or radar to measure the crop distribution on the sieve 48 or the grain pan 44.

A problem in the prior art that the present invention addresses will now be further discussed. A difference in the load between the left and the right side of the sieves can be the result of the rotor, or other threshing and separation units, dropping more of the crop material 72 to one side of the cleaning system 26. Further, more material may be fed to the threshing and separating system 24 with a similar unbalanced crop material distribution resulting. A bad lateral sieve calibration or the lateral combine slope can also be a contributing factor for a material imbalance and hence to degraded cleaning system performance. When the crop material 72 on the sieves is not equally distributed over the width of the sieve 48, the cleaning capacity decreases. The airflow is not able to blow to one side of the cleaning system 26, due to there being too much material causing a portion of the sieve 48 to be blocked and the airflow escapes at the other side of the sieve 48 resulting in a blow out situation. The cleaning capacity is decreased and cleaning losses occur.

The present invention detects an unbalanced situation upon the upper sieve and the lateral angle of the upper sieve is adapted. This is done with a feedback control carried out by the controller 84, where the unbalance is the feedback parameter. In this way a certain unbalance can be set so that the control doesn't react in an unstable manner. Now, two methods will be discussed to detect the unbalance. Other methods to determine a left-right unbalance are also contemplated. The first method uses the pressure sensors 80 and 82 that are positioned right underneath the sieve 48. The pressure sensors 80 and 82 are positioned in the last 50 cm of the sieve 48, so that they detect the unbalance at the back of the sieve 48. The pressure sensors 80 and 82 have to be placed on both sides (the left and the right sides) of the sieve 48. If the measured pressure on one side is higher than on the other side, it means that there is more crop material 72 upon the sieve 48 on that side. If the measured pressure difference between the left and right is high enough, an alteration of the lateral sieve angle or a change in the side movement of the sieve 48 to throw the crop material 72 on the sieve 48 to the more unloaded side is undertaken by the sieve slope compensating system 90 to solve the imbalance.

The second method uses two impact sensors 88 at the back of the cleaning section 26. The sensors 88 are placed in a way so that they detect the sieve off losses. The signals of the two sensors 88 are constantly compared. When one signal becomes higher than the other, it means that there is more crop on that side and there is an unbalanced condition on the upper sieve. The controller 84 decides whether the difference is big enough to react and to adapt the lateral sieve angle. In both situations the set-point of the system may be a difference of 0, so that there is no unbalance.

The above discussed approaches can restore the balance of the crop material 72 upon the sieve 48 so that the total surface of the sieve 48 is used in a more efficient manner. This will advantageously result in increased cleaning capacity. On single rotor machines the increase in capacity may be the largest. Current manual lateral sieve offset can now be replaced by the present invention acting upon the true measured imbalance rather then a factory open loop offset setting.

The present invention has certain advantages including improved cleaning system performance allowing the cleaning system 26 to be able to more effectively separate grain from material other than grain.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A cleaning section of an agricultural harvester, the cleaning section comprising:
   a sieve positioned in the harvester to receive crop material from a threshing section;
   a plurality of load sensors coupled to the sieve, the load sensors being configured to produce signals representative of a distributed load of the crop material on the sieve, the load sensors comprising a plurality of pressure sensors;
   a sieve slope compensating system configured to tilt or side shake the sieve dependent upon the signals; and
   a controller coupled to the load sensors and the sieve slope compensating system, the controller configured to preferentially react to the signals of two of the pressure sensors as compared to others of the pressure sensors.

2. The cleaning section of claim 1, wherein the controller is communicatively coupled to the load sensors and the sieve slope compensating system, the controller being configured to cause the sieve to be shaken to substantially minimize a grain loss of the sieve.

3. The cleaning section of claim 2, wherein the controller is further configured to cause the sieve to be shaken to substantially laterally balance the distributed load of the crop material on the sieve.

4. The cleaning section of claim 1, wherein the plurality of pressure sensors comprises a first pressure sensor and a second pressure sensor, the first pressure sensor being along a side of the sieve, the second pressure sensor being along an opposite side of the sieve.

5. The cleaning section of claim 4, wherein the crop material has a general direction of movement on the sieve, the first pressure sensor and the second pressure sensor being generally located on a line perpendicular to the general direction of movement of the crop material.

6. The cleaning section of claim 4, wherein the plurality of pressure sensors further comprises a third pressure sensor and a fourth pressure sensor, the first pressure sensor, the second pressure sensor, the third pressure sensor, and the fourth pressure sensor being respectively positioned proximate to each of four corners of the sieve.

7. The cleaning section of claim 1, wherein the controller is configured to receive signals from each of the plurality of pressure sensors.

8. The cleaning section of claim 6, wherein the controller is configured to preferentially react to the signals of two of the pressure sensors that are close to an area where crop material first contacts the sieve as compared to others of the pressure sensors.

9. The cleaning section of claim 1, wherein the controller preferentially reacts to the signals of the pressure sensors positioned at an end of the sieve opposite to the direction of movement of material on the sieve.

10. The cleaning section of claim 1, wherein the signals of two of the plurality of load sensors are combined to form a difference signal, the sieve slope compensating system being further configured to tilt the sieve dependent upon the difference signal.

11. A method of altering a crop material distribution on a sieve in a cleaning section of claim 1, the method comprising steps of:
   detecting an imbalance in the distributed load on the sieve; and
   actuating at least one actuator to laterally shake the sieve dependent upon the imbalance to thereby redistribute the crop material.

12. The method of claim 11, wherein the detecting step comprises a step of sensing pressure along lateral sides of the sieve as the crop material is moving along the sieve.

* * * * *